United States Patent [19]
Emsens

[11] Patent Number: 5,740,722
[45] Date of Patent: Apr. 21, 1998

[54] MACHINE FOR THE AUTOMATIC PRODUCTION OF MEAT AND/OR VEGETABLE KEBABS

[76] Inventor: Michel Emsens, Z.A. du Parc, 42490 Fraisses, France

[21] Appl. No.: 817,294

[22] PCT Filed: Sep. 22, 1995

[86] PCT No.: PCT/FR95/01218

§ 371 Date: Apr. 15, 1997

§ 102(e) Date: Apr. 15, 1997

[87] PCT Pub. No.: WO96/11579

PCT Pub. Date: Apr. 25, 1996

[30] Foreign Application Priority Data

Oct. 17, 1994 [FR] France .................... 94 12774

[51] Int. Cl.⁶ .................. A22C 17/00; A22C 17/02; A47J 37/04
[52] U.S. Cl. .................. 99/419; 99/421 H; 99/443 C
[58] Field of Search .................. 99/419–421 V, 99/443 R, 443 C, 386, 494, 516, 450.1; 29/432; 83/466.1; 227/3, 101, 103, 139; 452/149, 174; 426/421

[56] References Cited

U.S. PATENT DOCUMENTS

| | | | |
|---|---|---|---|
| 3,835,761 | 9/1974 | Yamanaka | 99/421 H |
| 4,842,181 | 6/1989 | Walser | 99/352 X |
| 5,109,757 | 5/1992 | Dolle | 99/419 |
| 5,127,319 | 7/1992 | Dolle | 99/419 |

FOREIGN PATENT DOCUMENTS

| | | |
|---|---|---|
| 0078232 | 5/1983 | European Pat. Off. . |
| 0098451 | 1/1984 | European Pat. Off. . |
| 0278879 | 4/1988 | European Pat. Off. . |
| 2550076 | 2/1985 | France . |
| 2642939 | 4/1990 | France . |
| 2668895 | 5/1992 | France . |
| 2675343 | 10/1992 | France . |

Primary Examiner—Timothy F. Simone
Attorney, Agent, or Firm—Wall Marjama & Bilinski

[57] ABSTRACT

An automatic kebab making machine includes plates with recesses for accepting the ingredients. The plates interact with at least one skewering system for inserting (or placing) a spit into each recess, thereby passing it through the accepted ingredients to form a kebab. Each recess is generally rectangular and defines a space that can be filled completely with ingredients. The length, breadth and depth of the recess substantially matches the dimensions of the kebab to be prepared, and the ends of the recess communicate with clearances for holding a spit.

10 Claims, 8 Drawing Sheets

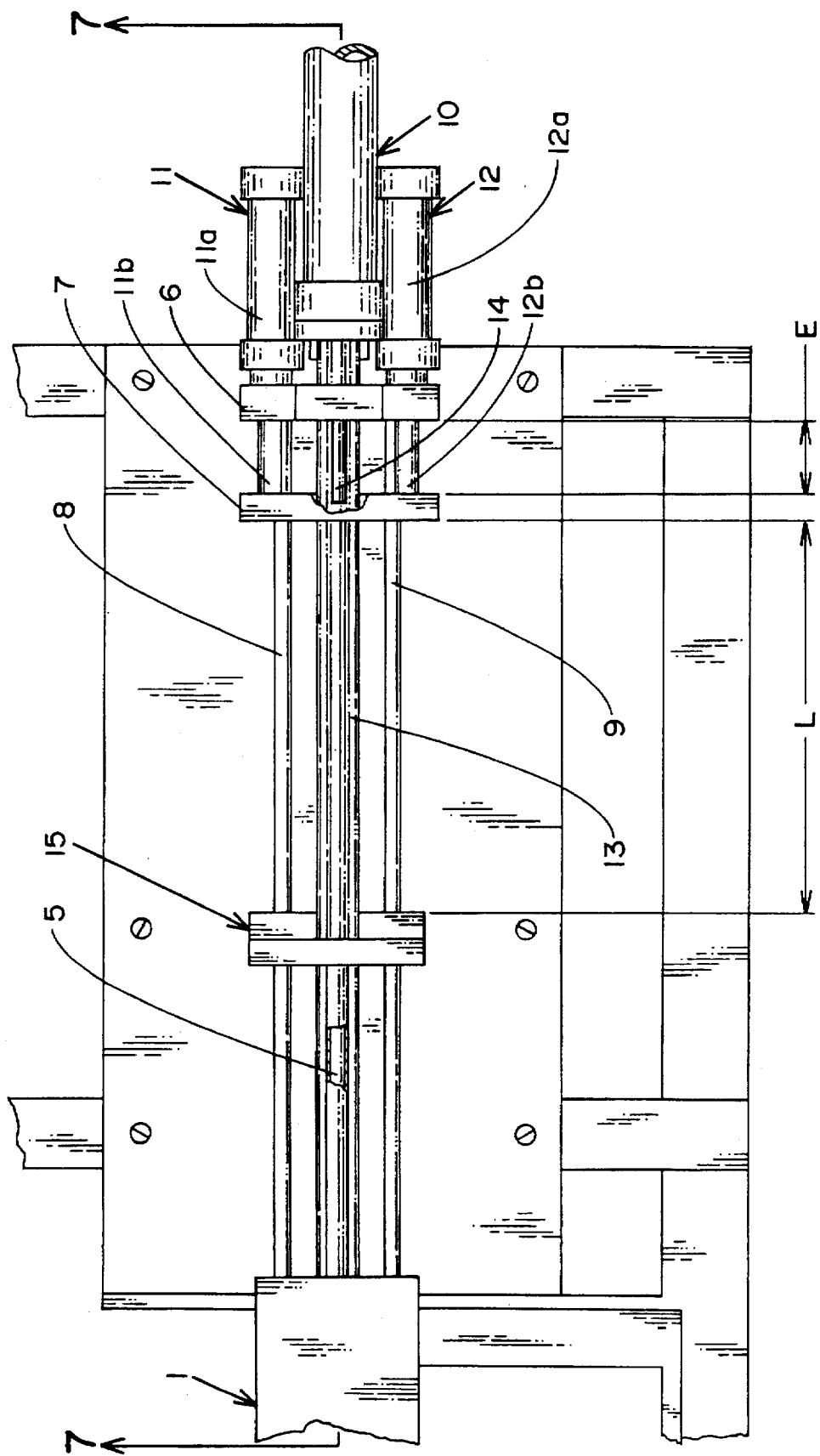

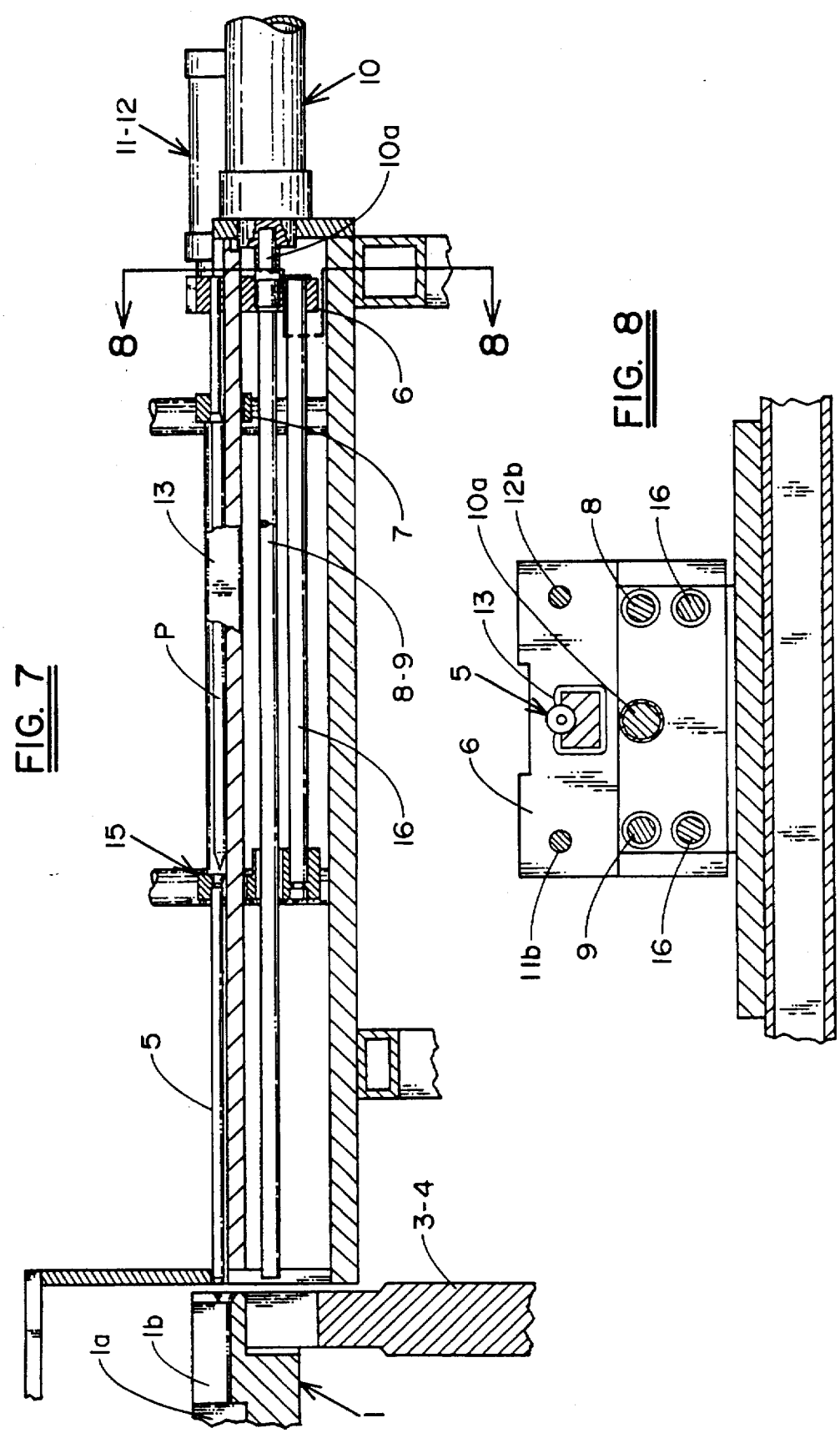

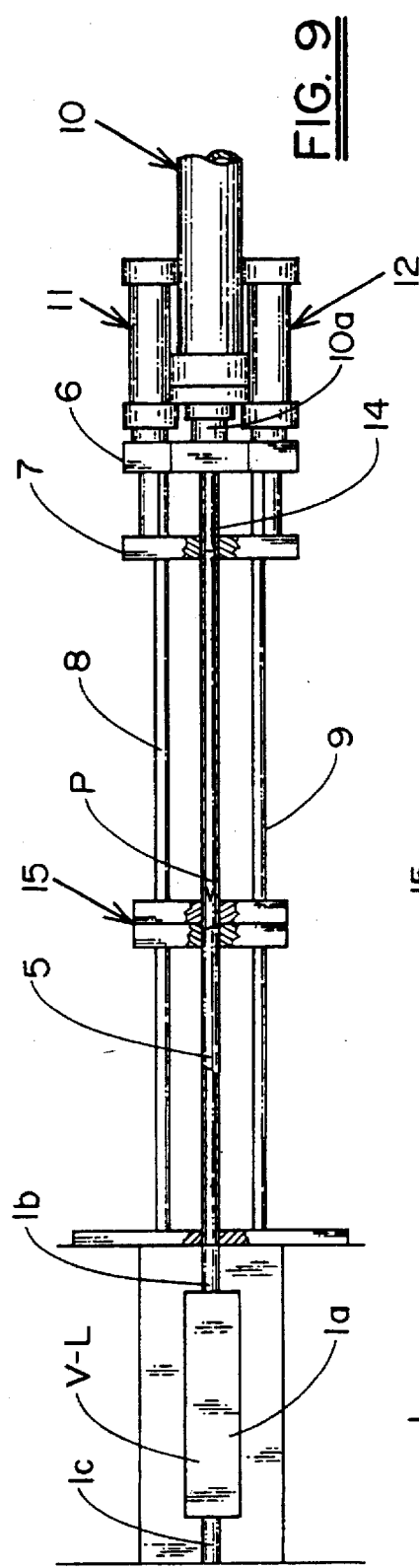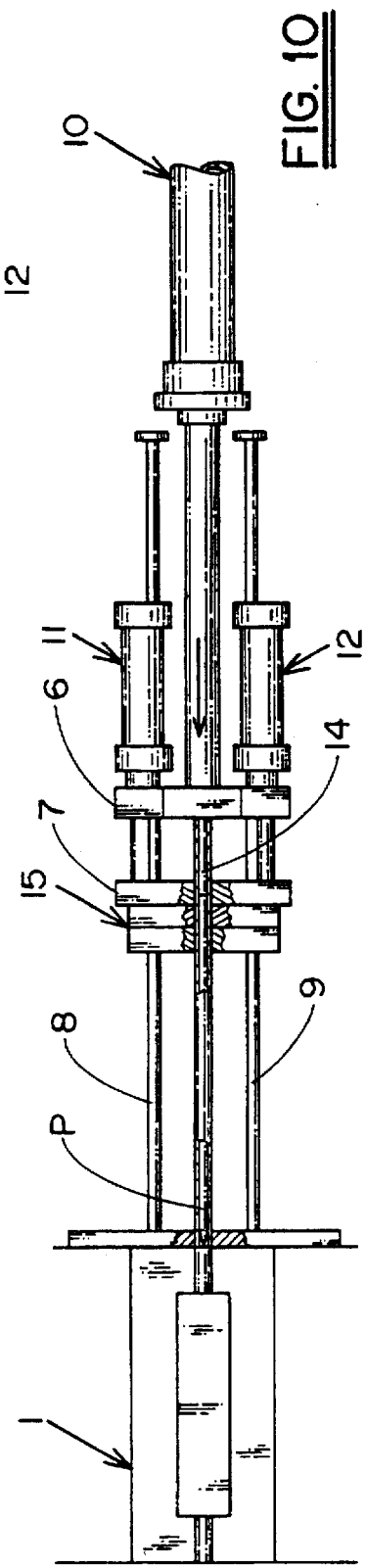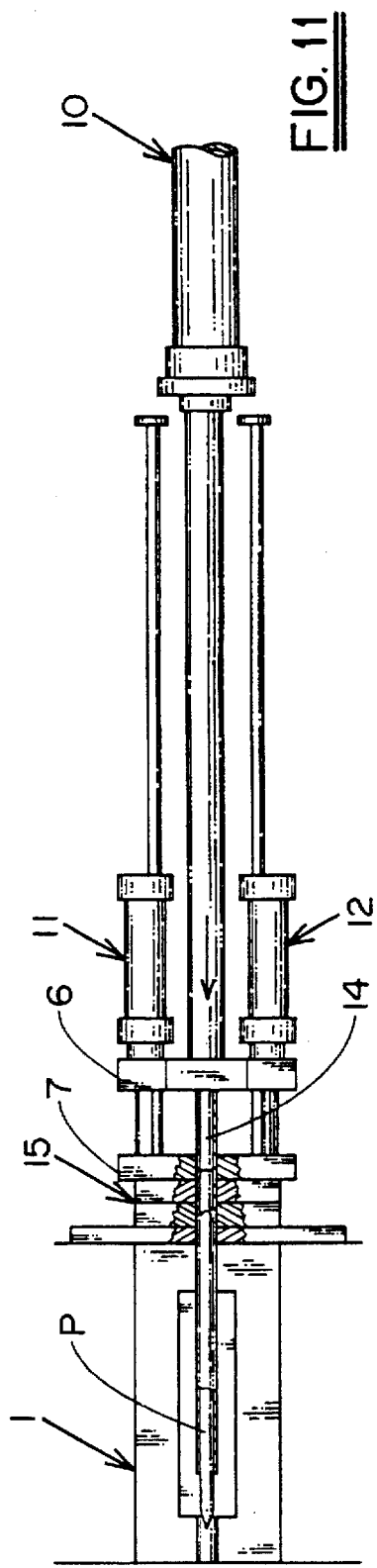

MACHINE FOR THE AUTOMATIC PRODUCTION OF MEAT AND/OR VEGETABLE KEBABS

BACKGROUND OF THE INVENTION

The invention relates to the technical field of machines for processing foodstuffs.

In order to produce kebabs on an industrial scale, machines that can be used for semi-automatic or fully automatic cutting up and skewering have been proposed, for instance (for information only and in no way exhaustively) the techniques disclosed in Patents FR 8316928 and 8517975.

Regardless of the solutions used, the basic principle of these various techniques is the result of using a tub in which the various layers of meat and vegetables are placed in the form of slices. The walls of the tub have vertical slits to allow the movement of cutting blades.

These various solutions have brought considerable progress in the design of kebabs compared with production by hand. However, given the operating principle of these machines, the choice of kebabs is necessarily restricted. In fact, it is only possible to use a certain type of meat and, above all, only a single type of vegetable, generally consisting of peppers, given the fact that the various ingredients have to be placed inside the tub in flat slices. The composition of the finished kebabs is therefore limited.

In addition, these kebabs always have the same appearance, i.e. they are generally of parallelepiped shape.

It therefore seems that the technique of automatic skewering cannot be used to produce kebabs of the type that can be made manually and which include, depending on the consumer's preferences, a plurality of ingredients resulting from various pieces of meat and vegetables.

U.S. Pat. No. 3,835,761 describes a machine for producing kebabs by means of recesses in which foodstuffs are placed and then subjected to a skewering action in order to produce a kebab. Nevertheless, the solution proposed in this patent is unsatisfactory. This machine uses a belt conveyor in the form of plates that are flexibly joined to each other, each plate having separate recesses which each contain an ingredient. As a result, this imposes a limit on the products to be skewered which must be cut to size to match the recess in question given the fact that each recess corresponds to one product.

In addition, the spacing between each of the recesses on a single plate to make up a kebab means that, after skewering, the ingredients on the skewer are not contiguous and are separated by a gap that essentially corresponds to the distance separating two recesses. The kebab thus obtained therefore has an unsatisfactory visual appearance.

Patent FR 2550076 also discloses an apparatus used to make up kebabs. This apparatus comprises a unit with a cover, said unit having a central opening that contains the product to be skewered. The opening communicates with two small-spit guides intended to ensure correct centering of a metal rod. It is therefore clear that this patent does not involve a machine for the automatic production of kebabs on an industrial scale and simply relates to an apparatus to make up kebabs by hand. In this patent there is no problem of continuous automatic skewering of products contained in the recess. In this patent the problem is to avoid injury when the small spit, which is made of metal, is pushed in.

SUMMARY OF THE INVENTION

The invention sets itself the objective of overcoming these drawbacks in a simple, safe, effective and rational manner.

The problem which the invention intends to solve is to automate the production of kebabs which include, in their composition, any combination of various pieces of meat and different vegetables such as tomatoes, mushrooms, peppers or onions without thereby excluding other ingredients such as prunes, pineapple and, generally speaking, any type of ingredient which is or is not cut to size.

The problem posed is therefore to industrially produce hand made-type kebabs with the objective of ensuring automatic skewering of pieces of meat and other vegetables with the possibility of using skewers or small spits made of wood in particular.

In order to solve such a problem, a machine has been devised and perfected of a type comprising means of support having recesses suitable for containing ingredients, said means cooperating with at least one skewering system capable of placing a skewer or small spit in each of the recesses so that, at the same time, it passes through the ingredients in the form of pieces of meat and/or vegetables and/or fruits in order to make up a kebab.

According to the invention, the machine is distinguished by a combination of arrangements:

The skewering system essentially comprises a tube, means of inserting a small spit into the tube, means of obtaining translational motion of the small spit/tubes assembly in order to press them into the pieces of meat and/or vegetables placed in the recess, means of pushing the small spit relative to the tube so that it protrudes, and means of withdrawing the tube so that only the small spit remains pushed into the pieces of meat and/or vegetables, Each recess has a generally rectangular shape enclosing a space capable of being completely filled with ingredients, the dimensions of said recess substantially matching the dimensions of the kebab that is to be produced and each end of the recess communicates with open-ended clearances in order to fit the tube that accommodates the small spit.

In order to solve the problem of ensuring that the items which make up the kebab are secured during the skewering operation, each recess cooperates, at the moment of skewering, with a compression counterform capable of exerting a pressure on the pieces of meat and/or vegetables.

According to another aspect, each recess has devices for ejecting the kebab.

In order to solve the problem of continuously producing kebabs, the support means consist of plates that are linked together and controlled by control and transfer units so that they are successively moved step by step opposite one or more skewering stations and each of the plates has at least one recess.

Advantageously, the means of inserting the small spit into the tube consists of a moving pusher assembly controlled by actuators, the moving means of obtaining translational motion of the small spit/tube assembly consisting of a second moving assembly capable of being moved by the first assembly which has a pin capable of ensuring, in the limit stop position of the two assemblies corresponding to penetration of the small spit/tube assembly into the pieces of meat and/or vegetables from one of the ends of the recess, movement of the small spit relative to the tube so that it protrudes at the other end of the recess, said assemblies then being successively returned to their initial position.

In order to solve the problem of continuously producing kebabs, the support means consist of plates that are linked together and controlled by control and transfer devices so that they are successively moved step by step opposite one or more skewering stations and each of the plates has at least one recess.

Also with the objective of automating all the operations, the small spits are stored in a magazine equipped with a selection system capable of dispensing a single small spit so that it can be positioned on a horizontal support cradle located between the two assemblies.

In order to solve the problem of ensuring automatic ejection of the kebabs, at the outlet of the skewering system(s), ejector devices consist of a shaped iron mounted in the bottom of the recess and capable of upward vertical movement, said iron cooperating, at the outlet from the skewering station, with a device capable of ensuring it is lifted in order to cause associated ejection of the kebab.

The invention is explained below in greater detail, reference being made to the accompanying drawings in which:

BRIEF DESCRIPTION OF THE DRAWINGS

FIG. 6 is a plan view of the skewering station.

FIG. 7 is a cutaway view along line 7.7 in FIG. 6.

FIG. 8 is a cutaway view along line 8.8 in FIG. 7.

FIG. 9 is a schematic plan view of the skewering operation at a first stage after the spit has been inserted into the tube.

FIG. 10 is a schematic plan view according to the invention when plate (7) comes into contact with plate (15).

FIG. 11 is a schematic plan view according to the invention when plate (7) comes into contact with plate (15).

DESCRIPTION OF THE INVENTION

Figure 1:
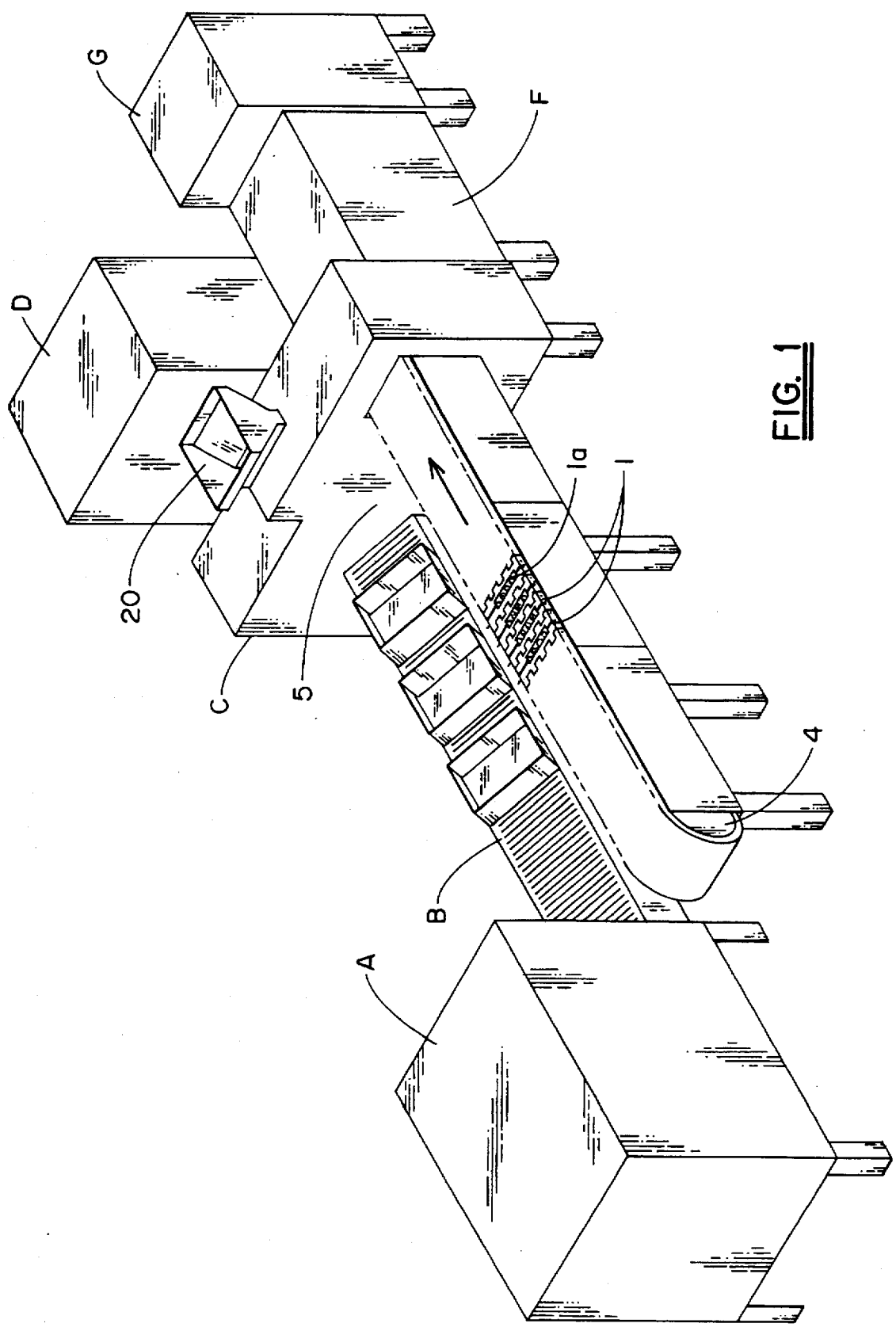
FIG. 1 is a schematic perspective view showing one possible layout configuration of an installation to produce kebabs in accordance with the characteristics of the invention.
Figure 2:
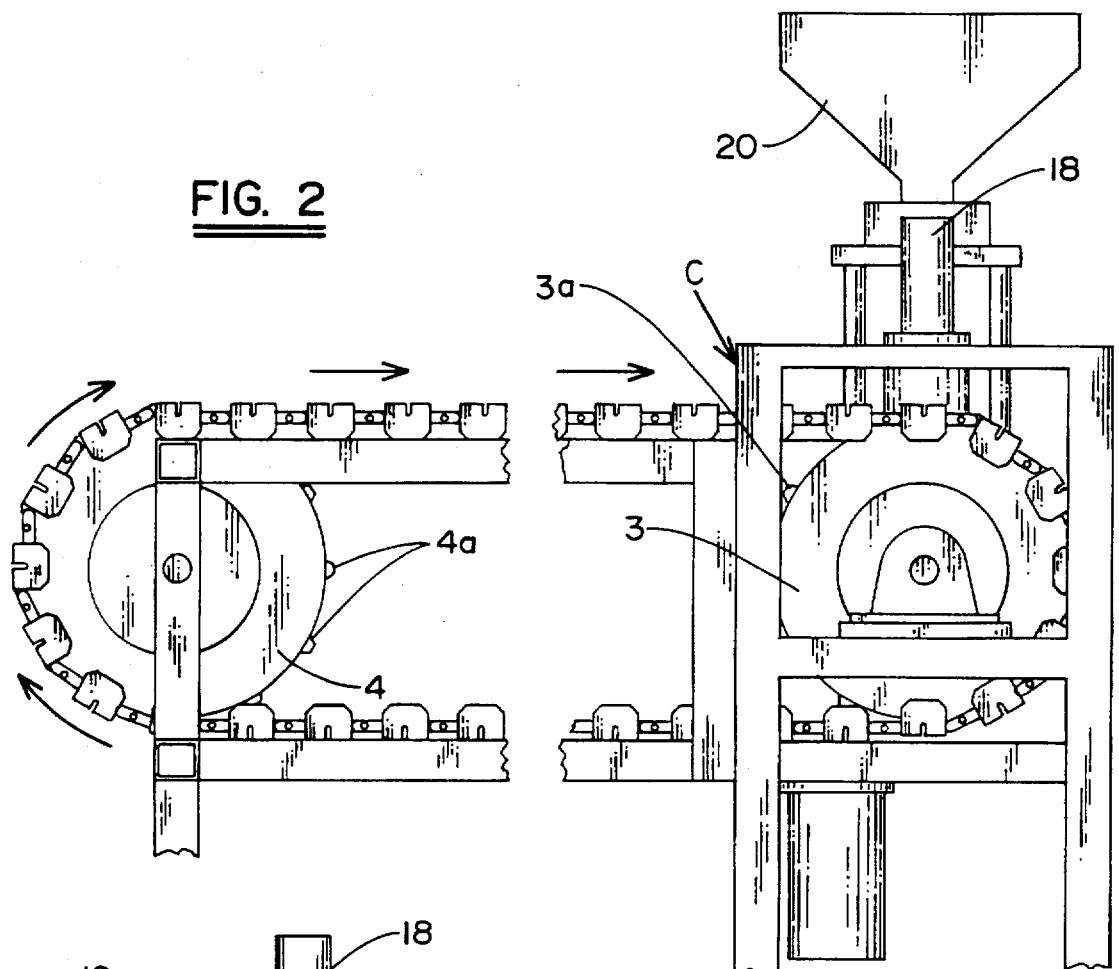
FIG. 2 is a longitudinal cutaway view of the machine.
Figure 3:
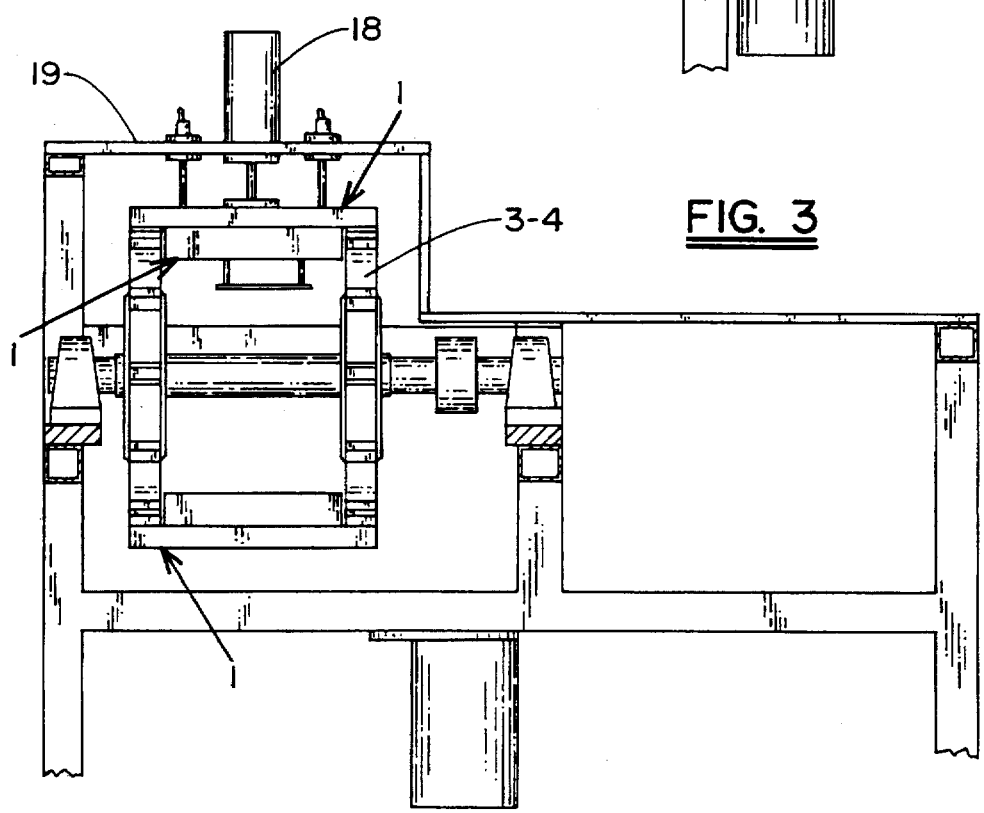
FIG. 3 is a transverse cutaway view along line 3.3 in FIG. 2.

According to the invention, the machine comprises a plurality of plates (1) each of which has at least one recess (1a) intended to be filled with the required ingredients (pieces of meat, vegetables, fruit etc.) in order to make up the kebab. The plates are controlled by any means of control and transfer so that they are successively moved step by step opposite at least one skewering station.

For instance, the plates (1) are devised so that they are flexibly joined to each other and cooperate with drive drums (3) and (4) so as to form an endless transfer line. The drive drums (3) and (4) may have pins (3a) (4a) that cooperate with matching holes formed near the edges of each of the plates.

Each recess (1a) has a generally rectangular shape and its length, width and depth dimensions substantially match the dimensions of the kebab that is to be obtained. Each of the ends of this recess (1a) communicates with open-ended clearances (1b) (1c) formed in the thickness of the plate (1) and coaxially aligned with the middle part of the recess (1a).

As will be stated in the remainder of the description, these clearances (1b) (1c) allow the insertion of small spits (P) with their means of skewering.

The skewering system is essentially implemented by means of a hollow tube (5) designed to accommodate a small spit (P). For this purpose, the skewering system is equipped with means of inserting the small spit (P) into the tube as well as means of obtaining translational motion of the small spit/tube assembly in order to push them into the various pieces of meat and/or vegetables placed in the recess (1a) of a plate (1).

In particular and as shown in FIGS. 6, 7 and 8, these means of insertion and skewering consist of a first moving pusher assembly controlled by actuators. This moving assembly comprises two plates (6) (7) that can move relative to a fixed support cradle (13) that holds the small spit (P). The plate (6) is linked to the rod (10a) of a coaxial actuator (10). This plate (6) is also linked to the shafts (11a) and (12a) of two actuators (11) and (12) of which the rods (11b) and (12b) are linked to plate (7) and pass through plate (6) freely. Plates (6) and (7) are parallel and spaced a preset distance apart (E). The plates (6) and (7) are therefore linked to each other via actuators (11) and (12). Plate (6) is mounted with the ability to slide on parallel guide rods (8) (9).

In addition, this plate (6) is joined to a coaxial pin (14) that is aligned with the support cradle (13) so that it is positioned opposite small spit (P). Pin (14) passes freely through plate (7).

Tube (5) is linked to a second moving assembly essentially consisting of a plate (15) mounted with the ability to slide freely along parallel guide rods (8) (9). This plate (15) is located at a distance (L) from plate (7) corresponding essentially to the length of a small spit. This spacing (L) is obtained, in particular, by a bar (16) joined to plate (15) and mounted with the ability to slide on the base of plate (7).

Tube (5) is positioned in coaxial alignment with the unobstructed clearances (1b) and (1c) in the recesses (1a) of each of the plates (1).

Figure 4:
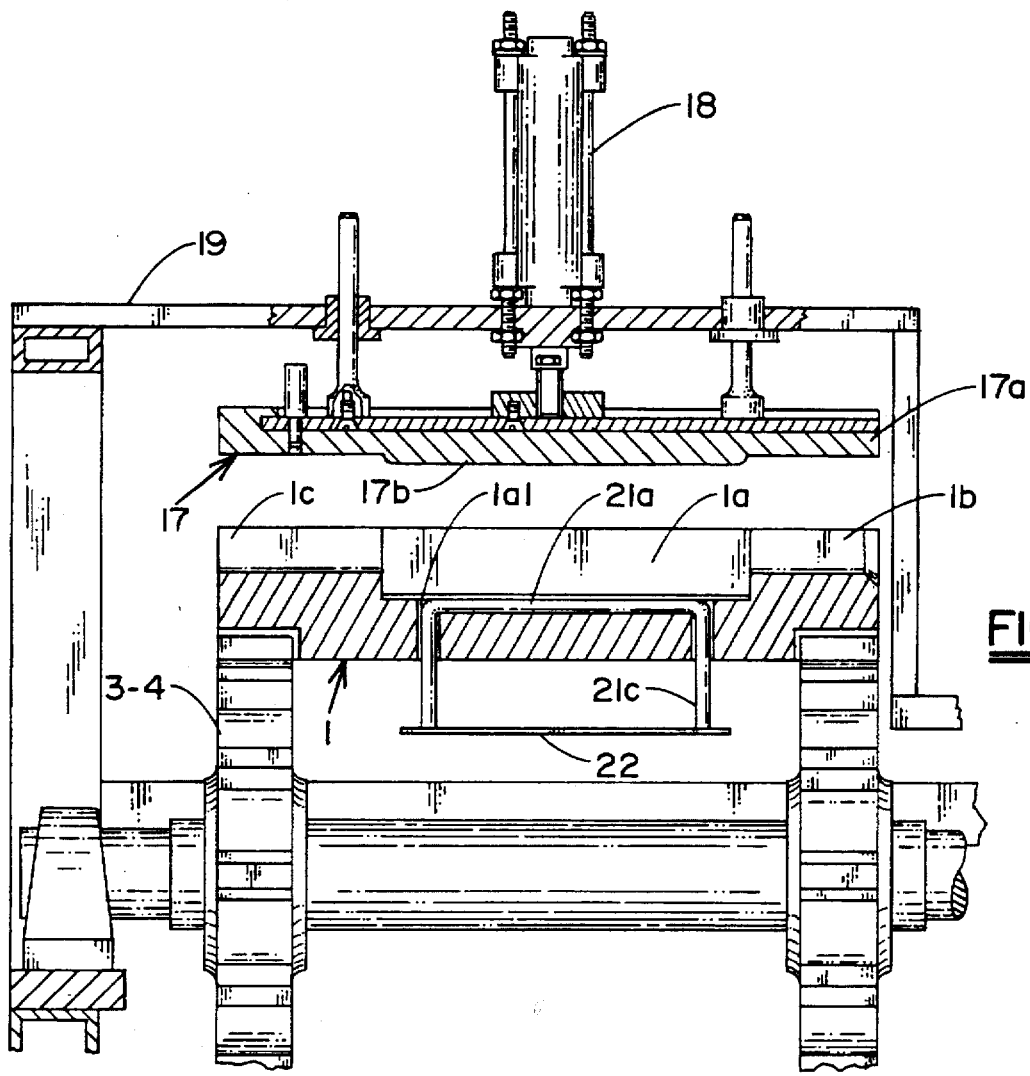
FIG. 4 is a view showing details of the compression station.
Figure 15:
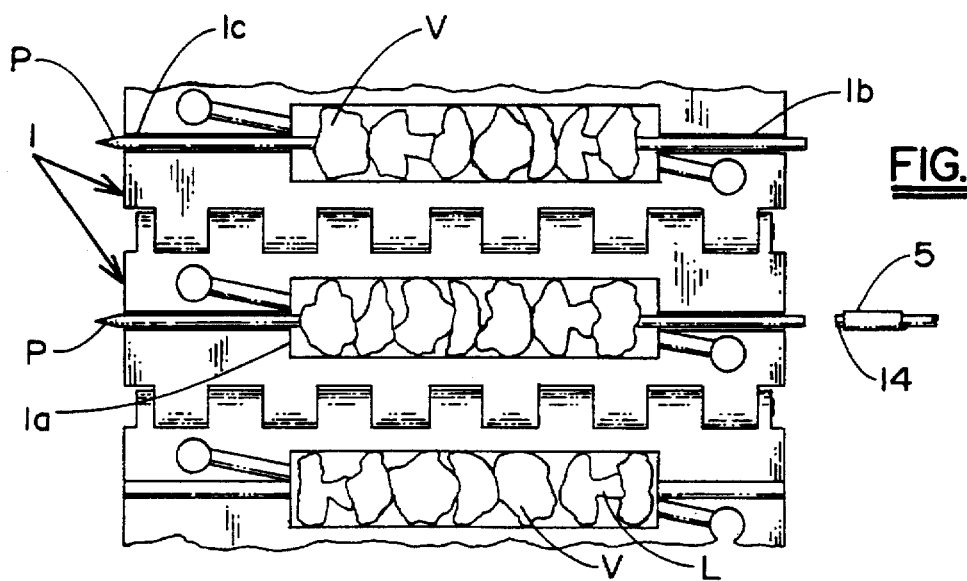
FIG. 15 is a plan view of a plate showing a kebab assembled according to the characteristics of the invention before the kebab is ejected.

According to another aspect of the invention, the machine is equipped, close to and in combination with the skewering system, with a station capable of exerting pressure on the pieces of meat and/or vegetables contained in the recess during skewering (FIG. 4). For this purpose, each recess (1e) is capable of cooperating, during the skewering phase, with a compression device (17) which operates like a press. This compression device (17) may consist of a platen (17a) controlled by a control actuator (18) mounted on a support frame (19). Platen (17a) has a raised shape (17b) that matches that of recess (1a) and of which the height is determined in order to exert slight pressure on the pieces of meat and/or vegetables contained in recess (1a).

Note that the placing of a small spit (P) in the support cradle (13) is advantageously performed by any automatic dispensing and selecting means denoted in its entirety as (20).

According to another aspect of the invention, each recess (1a) cooperates with devices for ejecting the kebab.

Figure 5:
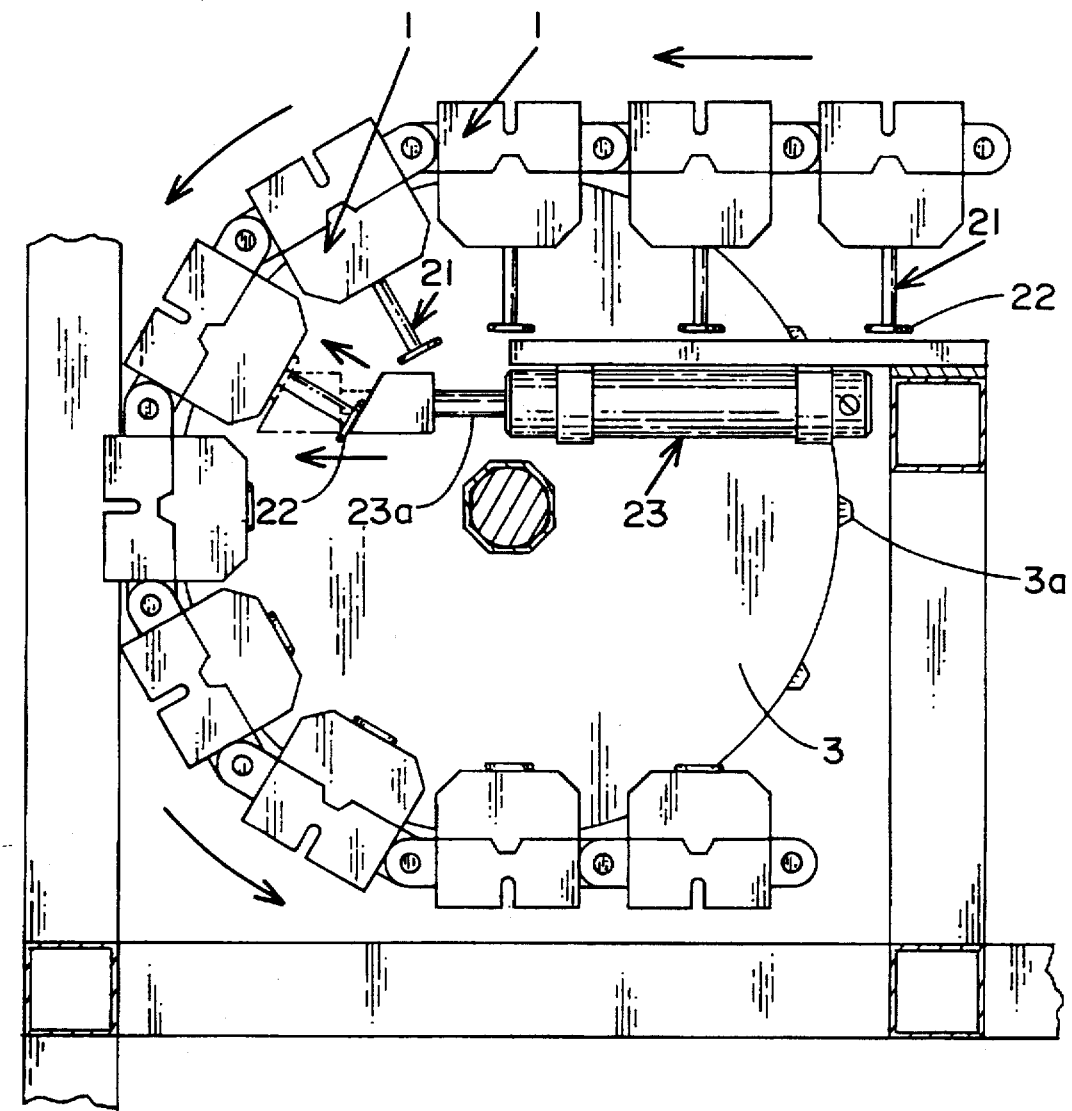
FIG. 5 is a view showing details of the ejection system.

As shown in particular in FIGS. 4 and 5, the ejection devices consist of a shaped iron (21) in the form of an inverted U having a central leg (21a) and, in a perpendicular plane, two lateral legs (21b) (21c). Iron (21) substantially cooperates with the centre part of recess (1a). The two legs (21b) and (21c) slidably fit into the thickness of the bottom of the recess (1a) whereas the middle leg (21a) is placed in a groove (1a1) formed in the bottom of the recess (1a).

The free end of legs (21b) and (21c) is linked by a flat mounting support (22). This ejection device (21) at the outlet from the skewering station may be operated by the action of a pusher actuator (23) of which the end of the rod (23a) is formed at (23b) in order to act on the flat support (22) so as to lift iron (21) in order to cause associated ejection of the kebab out of the recess (1a).

Advantageously, the pusher actuator (23) is placed on an appropriate part of the machine so as to act on the ejection devices (21) when the plates (1) are at the start of the lowering phase relative to drive drums (3) (4) in order to allow removal of the kebab by gravity at a station that is designed accordingly.

We shall now analyse the operation of the machine, reference being made to FIGS. 9 to 14.

The various pieces of meat (V) already cut to size and vegetables (L) are placed alongside each other in each of the recesses (1a) of the plates (1) in a manner which fills the recesses completely.

It should be noted that, given the specific characteristics of the machine, it is possible to fill the volume of each of the recesses with any ingredient of the user's choice. For instance, it is possible to load any type of pieces of meat (V) cut to size, any type of pieces of vegetables (L) such as mushrooms, tomatoes, onions and, if applicable, any type of fruit. Under the effect of the plate (1) transport system they are driven step by step by drums (3) and (4) and are successively moved opposite the skewering station(s).

In this way plate (1) is stopped and positioned next to skewering tube (5) in coaxial alignment with the insertion clearances (1b) and (1c) (FIG. 9).

Compression device (17) is actuated by actuator (18) and presses against the corresponding plate (1) and, consequently, exerts a slight pressure on the pieces of meat (V) and vegetables (L) under the effect of the raised shape (17b) pressing into recess (1a).

Actuator (10) is actuated in order to move, by means of its rod (10a), the first moving assembly consisting in particular of plates (6) and (7) along guide rods (8) and (9). The effect of this movement is to insert by means of plate (7) small spit (P) previously positioned in its support cradle (13) into tube (5) (FIG. 10).

When plate (7) comes into contact with plate (15), the latter is moved along rods (8) and (9) and the concomitant effect of this is to cause insertion of the tube (5) and small spit (P) assembly into passage (1b) and, consequently, skewering of the various pieces of meat and/or vegetables (FIG. 11).

Figure 12:
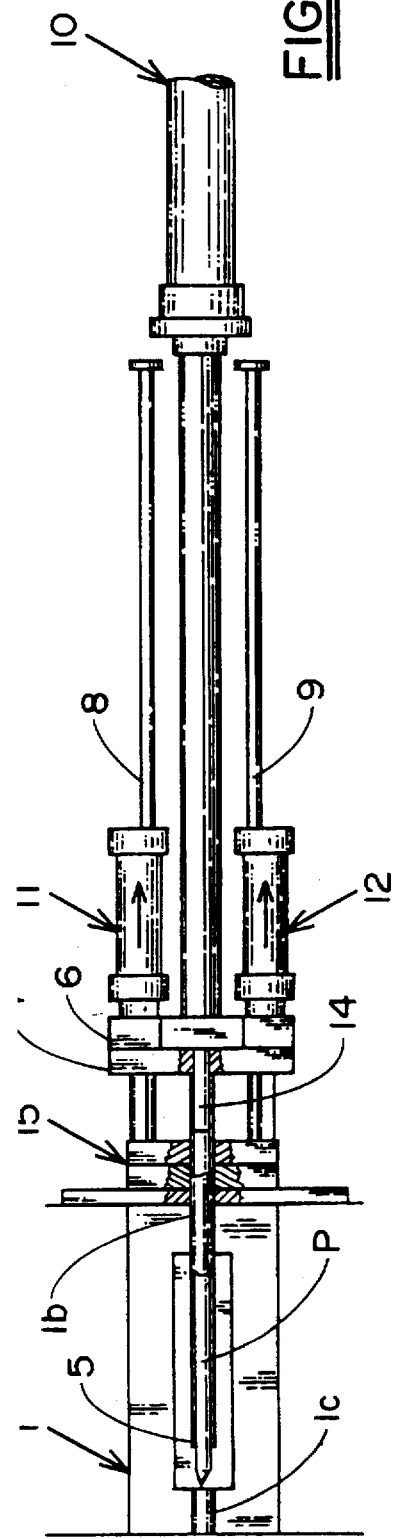
FIG. 12 is a schematic plan view according to the invention when plate (15) is in the limit stop position.
Figure 13:
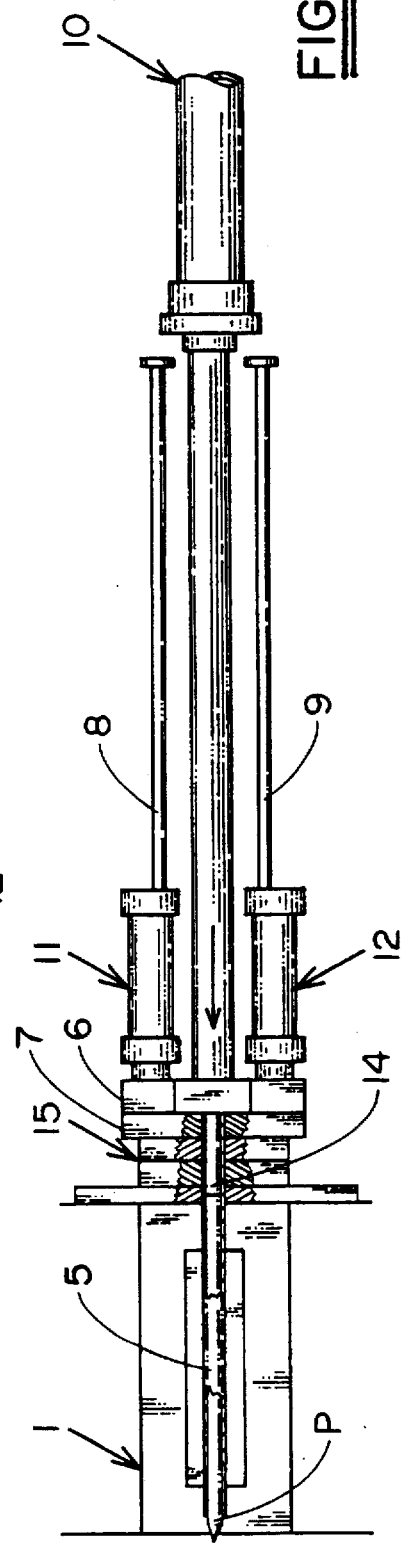
FIG. 13 is a schematic plan view according to the invention when skewering is completed.

In the limit stop position of plate (15), actuators (11) and (12) are actuated and this has the effect of causing retraction of plate (7) linked to rods (11a) and (12a) of said actuators (11) and (12) until plate (7) moves as far as the plate (6). As a result pin (14) protrudes, said pin fitting freely into plate (7) (FIG. 12). In this position the thrust action of actuator (10) will have the effect, through its rod (10a) of pushing both the plates (7) (6) and, consequently, pin (14) a distance that essentially corresponds to the initial spacing (E) between the two plates (6) and (7). Pin (14) penetrates into tube (5) in order to ensure movement of the small spit relative to tube (5) which remains stationary so that it projects into the opening of passage (1c) of recess (1a) (FIG. 13).

Figure 14:
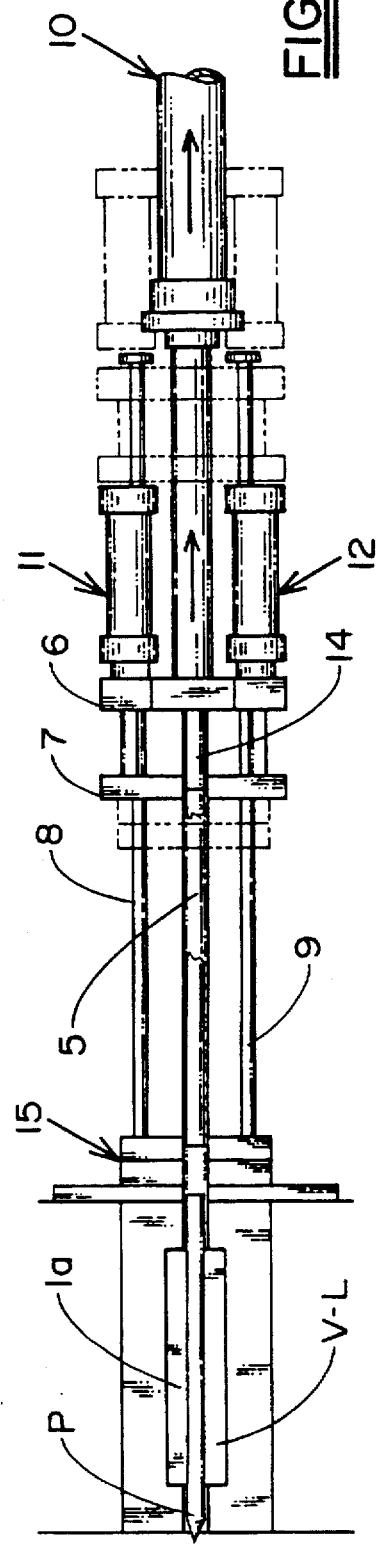
FIG. 14 is a schematic plan view according to the invention when the tube has been withdrawn from the spit.

Skewering is completed at this stage. It is then a matter of operating actuator (10) in the opposite direction in order to cause initial return of plates (7) and (6), then of plate (15) (FIG. 14).

The actuator (18) of the compression device is actuated in the opposite direction in order to clear recess (1a) and consequently release the kebab.

This skewering operation is repeated successively for each plate (1). After skewering, the plates (1) are moved linearly until the ejection device (21) of one of the plates reaches actuator (23) which is then operated in order to cause, by means of its rod (23a), lifting of device (21) which acts on iron (22). The leg (21a) of this device causes lifting of the entire kebab and its ejection by gravity onto another transfer belt or, for instance, directly into a tray.

Obviously, the various control devices, especially for moving the plates (1) step by step, for the skewering device, the compression device and the ejection system are controlled by any control system capable of continuous synchronised operation.

In order to increase the production rate, provision is made to at least duplicate the skewering station. Note that it is possible to use small spits made of wood or metal. The various plates (1) are removable and may have recesses (1a) of dimensions suitable for the type of kebab to be obtained. The same applies to the compression device of which the pressure plate (17a) is removable, the relief shape (17b) also being adapted to match the dimensions of the corresponding recess (1a).

FIG. 1 shows an example of the layout of the machine according to the invention used with other assemblies in order to create an automatic kebab production line. Unit (A) represents a machine capable of cutting up various pieces of meat to size. Unit (B) denotes a conveyor on which trays filled with pieces of meat and vegetables can be placed. This conveyor is advantageously located alongside the transfer chain formed by the linked plates (1).

Unit (C) denotes the frame of the machine which encloses the skewering device as defined above. Unit (C1) denotes the small-spit loader and unit (D) denotes an assembly capable of ensuring automatic dispensing of small spits onto support cradle (13).

Similarly, it is possible to place a unit (F) designed to obtain automatic placement in trays in alignment with the transfer chain consisting of the linked plates (1) and at the level of the ejection of the kebabs. This unit (F) may itself be followed by a unit (G) consisting of a film wrapping station.

The advantages are apparent from the description, the following points in particular are emphasised and restated:
  the possibility of obtaining industrial production of kebabs including any type of ingredients in order to make up a kebab of the same type as that produced by hand,
  the possibility of using small spits made of wood or metal,
  the numerous types of possible kebabs that can be produced.

I claim:

1. A machine for automatically producing a kebab, said kebab being a plurality of ingredients having a specified shape with a spit skewered therethrough, comprising:
  support means (1) for containing said plurality of ingredients;

said support means including at least one recess, each recess having a shape substantially congruent to said specified shape of said plurality of ingredients and each recess having a first end and a second end;

said support means including first (1b) and second (1c) open-ended clearances, each said open ended clearance (1b) (1c) fitting a tube (5);

said first end of said recess communicating with said first (1b) open-ended clearance; said second end of said recess communicating with said second (1c) open-ended clearance; and skewering means for skewering said spit through said plurality of ingredients contained in said support means, said skewering means including said tube (5);

inserting means (6) (7) for inserting said spit (P) into said tube (5) thereby forming a spit/tube assembly;

said inserting means including pushing means for pushing said spit such that said spit protrudes beyond said tube (5) in said spit/tube assembly;

translating means (15) for translating said spit/tube assembly from a first position adjacent said support means to a second position inside said recess such that said plurality of ingredients is skewered by said spit/tube assembly; and withdrawing means for withdrawing said tube from said spit/tube assembly whereby said spit remains skewered through said plurality of ingredients.

2. The machine of claim 1 wherein said inserting means further comprises a first moving pusher assembly (6) (7) controlled by an actuators (10) (11) (12) having a first initial position corresponding to said first position and said spit (P) not in said tube (5), and a first limit stop position corresponding to said spit passing through said plurality of ingredients, and wherein said actuators (10) (11) (12) control said first moving pusher assembly to move a second moving pusher assembly;

said translating means comprises said second moving pusher assembly, said second moving pusher assembly having a second initial position corresponding to said first position and said spit (P) not in said tube (5), and a second limit stop position corresponding to said spit passing through said plurality of ingredients;

a pin (14) that ensures translation of said spit relative to said tube when said first moving pusher assembly is in said first limit stop position and said second moving pusher assembly is in said second limit stop position, wherein said spit protrudes at said second open ended clearance (1c) and wherein said first pusher assembly is returned to said first initial position and said second pusher assembly is returned to said second initial position.

3. The machine of claim 2 wherein said actuator (10) includes a rod (10a), said actuator (11) including a shaft (11a) and a rod (11b), and said actuator (12) including a shaft (12a) and a rod (12b); and said first moving pusher assembly further comprises two plates (6) (7), said plates (6) (7) moving relative to a fixed support cradle (13) that holds said spit (P); wherein said plate (6) is linked to said rod (10a), to said shaft (11a), to said shaft (12a), is slidably mounted to parallel guide rails (8) (9), and is joined to a coaxial pin (14) that is in alignment with said fixed support cradle (13) and positioned by said support cradle to a position opposite said spit; said rod (11b) and said rod (12b) are each linked to said plate (7), and pass through said plate (6) freely;

said plates (6) (7) are set parallel to each other a predetermined distance apart; and said tube (5) is linked to a plate (15) that is slidably mounted on said parallel guide rails (8) (9), and is disposed a distance L from said plate (7), said distance L substantially corresponding to the length of said spit (P).

4. The machine of claim 2, wherein said inserting means, said translating means, and said withdrawing means are each arranged on a plane corresponding to the plane of each recess, and said plate (7) and said plate (15) are disposed from each other a distance substantially corresponding to the length of said spit (P).

5. The machine of claim 1, wherein each recess (1a) cooperates, at the time that said spit passes through said plurality of ingredients, with a compression counterform (17); said compression counterform exerting a pressure on said plurality of ingredients.

6. The machine of claim 1, wherein each recess includes an ejecting means (21) for ejecting said kebab.

7. The machine of claim 1, wherein said support means further includes an assemblage comprising one of a plate (1), and a plurality of plates (1) linked to each other, each said plate including at least one said recess (1a); said assemblage controlled by control and transfer means for successively moving said assemblage opposite at least one skewering station.

8. The machine of claim 1, wherein at least one said spit is stored in a magazine that includes a selection means for dispensing each spit individually for positioning each spit on a support cradle (13) between a first moving pusher assembly (6) (7) and a second moving pusher assembly.

9. The machine of claim 1, further comprising at least one ejection device that includes a shaped iron (21) mounted on the bottom of each recess, and a means for translating said shaped iron orthogonal to the plane of each recess to cause ejection of said kebab.

10. The machine of claim 1, wherein said support means further includes an assemblage comprising one of a plate and a plurality of linked plates, cooperating with a drive drums (3) (4) to form an endless line of said plates.

* * * * *